United States Patent [19]

Tracy

[11] Patent Number: 4,769,874
[45] Date of Patent: Sep. 13, 1988

[54] LINE RETENSION DEVICE

[75] Inventor: Richard J. Tracy, Elgin, Ill.

[73] Assignee: Barry R. Schotz, La Jolla, Calif.

[21] Appl. No.: 896,942

[22] Filed: Aug. 15, 1986

Related U.S. Application Data

[63] Continuation of Ser. No. 713,978, Mar. 20, 1985, abandoned.

[51] Int. Cl.⁴ .............................................. F16G 11/00
[52] U.S. Cl. ............................... 24/129 R; 24/115 G; 24/129 A
[58] Field of Search ............ 24/129 A, 115 G, 115 R, 24/117 R, 118, 121, 127, 129 R, 129 W, 35, 18, 30.5 R, 169, 198, 545; 713/978

[56] References Cited

U.S. PATENT DOCUMENTS

| | | | |
|---|---|---|---|
| 44,286 | 9/1864 | Darrah | 24/121 |
| 749,847 | 1/1904 | Curtis | 24/18 |
| 1,547,220 | 7/1925 | Kipp | 24/129 R |
| 1,752,752 | 4/1930 | Ogden | 24/129 R |
| 1,897,306 | 2/1933 | Flint | 24/30.5 R |
| 3,108,343 | 10/1963 | Mo et al. | 24/121 |
| 3,864,790 | 2/1975 | Reinwall, Jr. | 24/129 R |
| 4,477,947 | 10/1984 | Lyons | 24/115 G X |
| 4,506,417 | 3/1985 | Hara | 24/129 A X |

FOREIGN PATENT DOCUMENTS

| | | | |
|---|---|---|---|
| 5333 | of 1883 | United Kingdom | 24/115 G |
| 2016579 | 3/1979 | United Kingdom | 24/129 R |
| 560961 | 7/1977 | U.S.S.R. | 24/198 |

*Primary Examiner*—Francis K. Zugel
*Assistant Examiner*—Laurie K. Cranmer
*Attorney, Agent, or Firm*—Bernard L. Kleinke

[57] ABSTRACT

The line retension device includes a relatively thin plate having means defining an elongated passageway for receiving the line in a friction tight manner. The cross-sectional area of at least a portion of the passageway is complementary shaped and sized relative to the cross-sectional shape and size of the line. In one form of the invention, the passageway extends in a tortuous or non-linear configuration in the unstressed condition of the plate to grip the line frictionally. The plate is adapted to be flexed manually to deform it to a position where the configuration of the passageway is closer to that of a straight line, thereby permitting the line and the plate to be moved relative to one another in a much more facile manner.

3 Claims, 3 Drawing Sheets

U.S. Patent   Sep. 13, 1988   Sheet 1 of 3   4,769,874
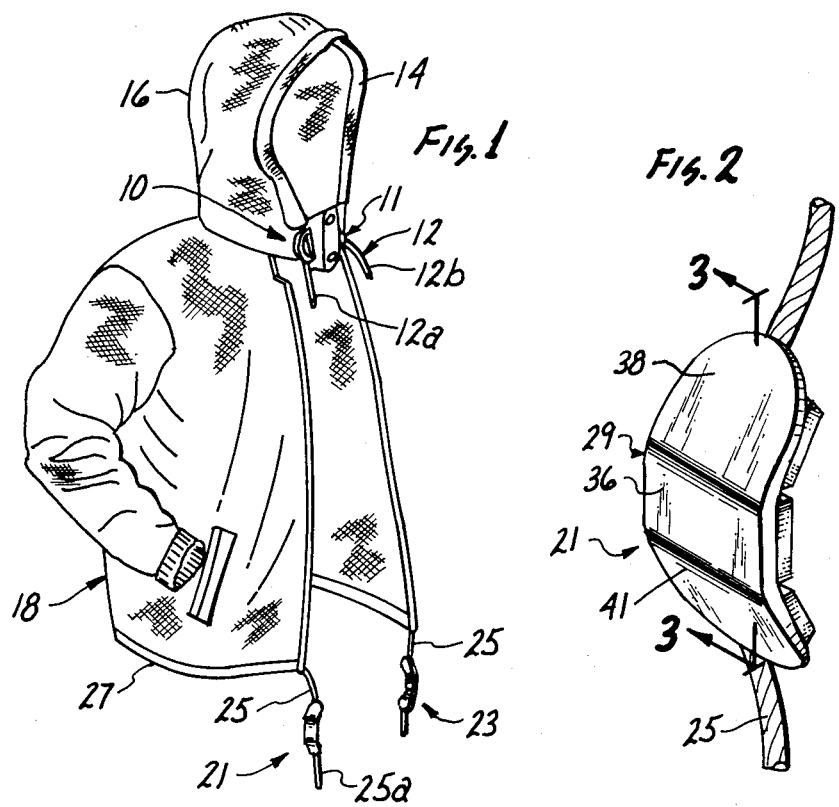
Fig. 1
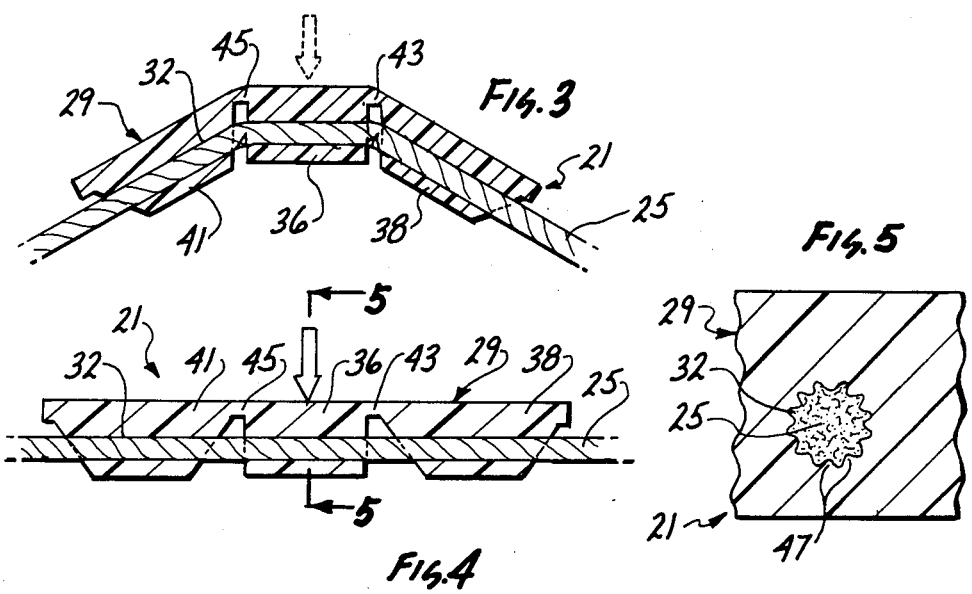
Fig. 2
Fig. 3
Fig. 4
Fig. 5

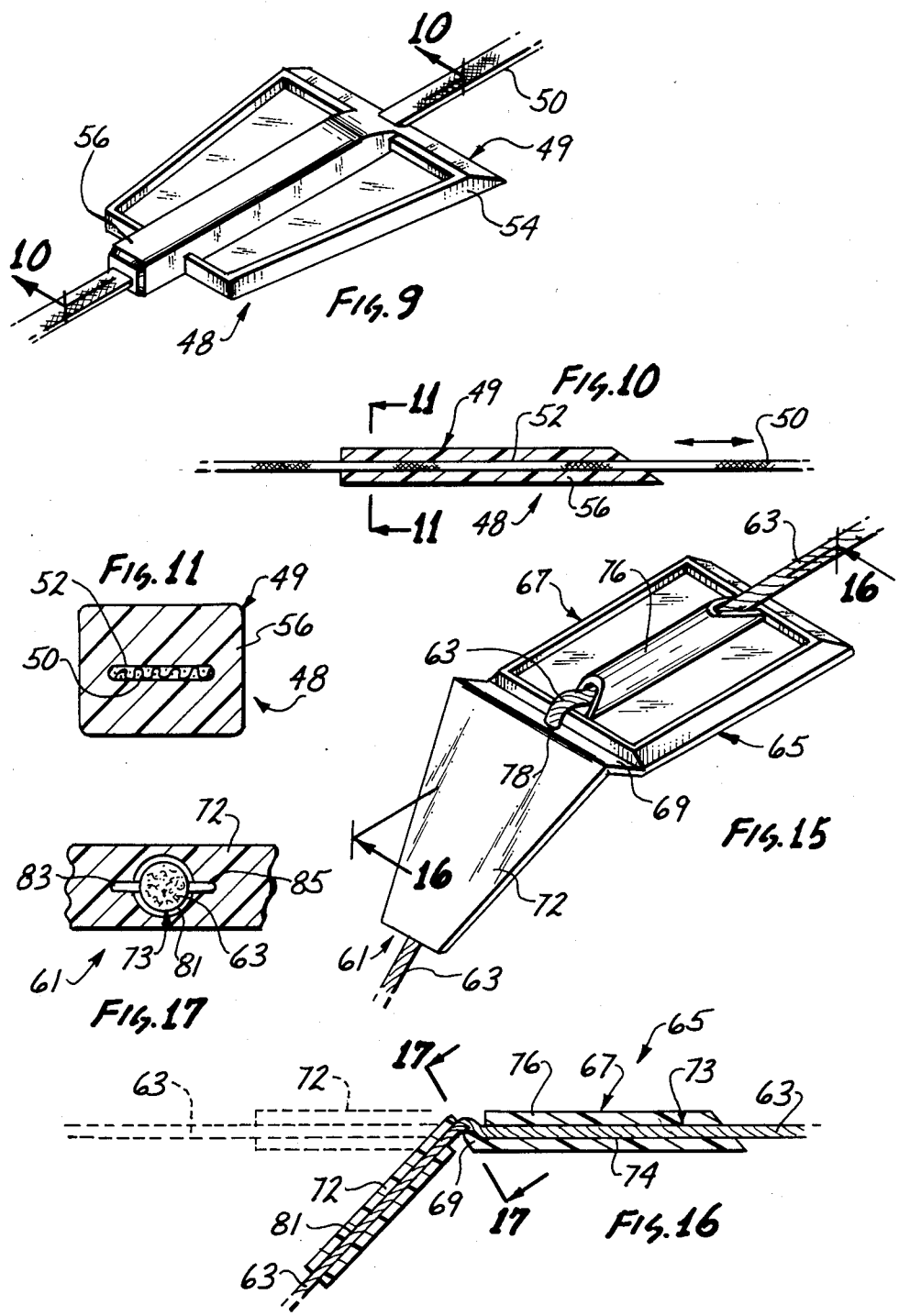

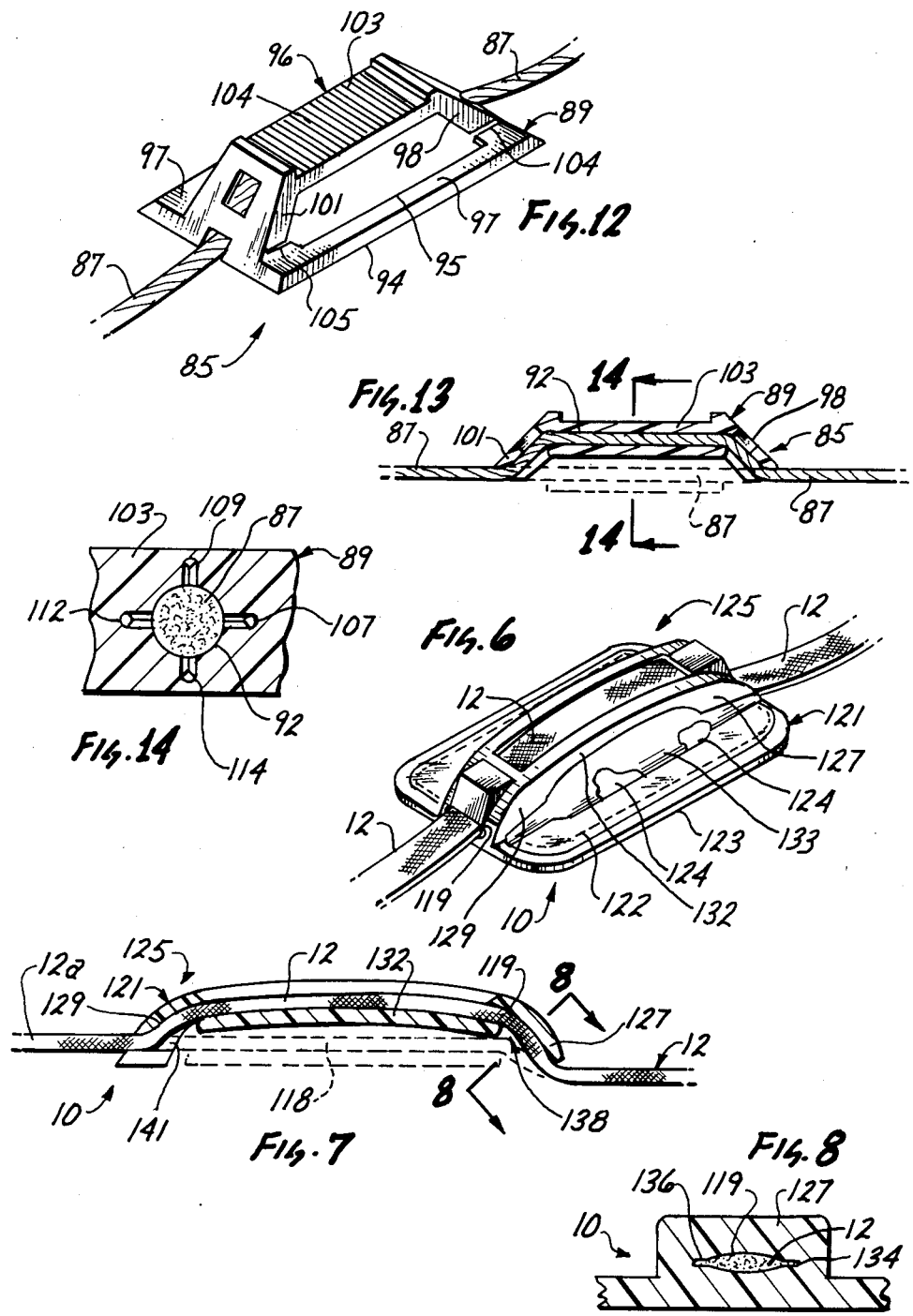

LINE RETENSION DEVICE

This is a continuation of application Ser. No. 713,978, filed on Mar. 20, 1985, now abandoned.

TECHNICAL FIELD

The present invention relates in general to a line retension device, and it more particularly relates to a device suitable for use with garments and other items, having drawstrings.

BACKGROUND ART

There have been various different types of cords and ribbons used in connection with garments such as jackets, hoods, boots and the like. Other types of devices and equipment, such as duffle bags, backpacks and other camping equipment, oftentimes employ drawstring lines for tightening the equipment in place. For example, drawstrings are employed about the mouth of a duffle-bag.

In many of these applications, the cord or ribbon is positioned in a seam of the fabric material, and is adapted to be pulled tight and then tied in place. The tying of a knot is not always convenient, especially in severe cold outdoor conditions. Additionally, the untying of the knot can prove to be awkward and not easily accomplished under severe outdoor weather conditions.

Another common problem associated with the use of drawstring lines is the fact that the end of the drawstring line can work its way inadvertently inside the channel of the item, and therefore it becomes necessary to somehow withdraw the end of the string from inside the channel when it becomes desirable to tie or otherwise secure the ends of the string in place. Such an operation is unwanted and undesirable.

In an attempt to overcome these problems, several devices have been employed. In this regard, reference may be made to the following U.S. Pat. Nos. 2,236,506; 2,915,274; 3,564,669; 3,065,512 and 4,288,891.

For example, U.S. Pat. No. 4,288,891 discloses a cord lock, which includes a multi-part spring-loaded depressible plunger, adapted to be secured releasably to the cord. While the patented device appears to address at least some of the foregoing-mentioned problems, it is relatively expensive to manufacture, due to the required assembly of the small parts. The several moveable parts are subject to malfunction. Also, the patented cord lock requires two hands to adjust positively the device and the cord.

Thus, it would be highly desirable to have a technique for tensioning a drawstring line in place in a convenient manner, and then for releasing the tension on the line when desired in an equally facile manner. At the same time, it would be very desirable to somehow prevent, or greatly reduce the possibility of having the end of the line enter the channel of the fabric inadvertently.

Such a device should be relatively inexpensive to manufacture. It is also very desirable to be able to adjust the position of the device by using only one hand.

DISCLOSURE OF INVENTION

It is the principal object of the present invention to provide a new and improved line retension device, which facilitates the tensioning of a drawstring line, in a convenient manner, and which enables the tension on the line to be released in a similarly easy manner.

It is another object of the present invention to provide such a new and improved line retension device, which is adapted to be used with fabric items, such as garments, having a drawstring line disposed within a channel of such an item, to prevent, or at least greatly reduce, the possibility of having the end or ends of the line inadvertently enter the channel.

A further object of the present invention is to provide such a new and improved line retension device, which is relatively inexpensive to manufacture, and can be operated with one hand of the user.

Briefly, the above and still further objects of the present invention are realized by providing a line retension device, for use with garments and other fabric items.

The line retension device includes a relatively thin plate having means defining an elongated passageway for receiving the line in a friction tight manner. The cross-sectional area of at least a portion of the passageway is complementary shaped and sized relative to the cross-sectional shape and size of the line. In one form of the invention, the passageway extends in a tortuous or non-linear configuration in the unstressed condition of the plate to grip the line frictionally. The plate is adapted to be flexed manually to deform it to a position where the configuration of the passageway is closer to that of a straight line, thereby permitting the line and the plate to be moved relative to one another in a much more facile manner.

The device is relatively inexpensive to manufacture, since it may be molded of a single piece of plastic material. It can also be operated by one hand of the user.

BRIEF DESCRIPTION OF DRAWINGS

The above-mentioned and other objects and features of this invention and the manner of attaining them will become apparent, and the invention itself will be best understood by reference to the following description of embodiments of the invention, taken in conjunction with the accompanying drawings, wherein:

FIG. 1 is a pictorial view of line retension devices, which are each constructed in accordance with the present invention, and which are shown used in connection with a garment;

FIG. 2 is an enlarged pictorial view of one of the devices of FIG. 1;

FIG. 3 is a sectional view of the device of FIG. 2 taken substantially on line 3—3 thereof;

FIG. 4 is a sectional view similar to the view of FIG. 3, except showing the device in its stressed condition;

FIG. 5 is an enlarged sectional view of the passageway of the device taken substantially on line 5—5 of FIG. 4;

FIG. 6 is an enlarged pictorial view of another one of the line retension devices of FIG. 1;

FIG. 7 is a sectional view of the device of FIG. 6;

FIG. 8 is an enlarged sectional view of the device of FIG. 7 taken substantially on line 8—8 thereof;

FIG. 9 is a pictorial view of yet another line retension device, which is constructed in accordance with the present invention;

FIG. 10 is a sectional view of the device of FIG. 9 taken substantially line 10—10 thereof;

FIG. 11 is an enlarged sectional view of the passageway of the device of FIG. 10 taken substantially on line 11—11 thereof;

FIG. 12 is a further line retension device, which is constructed in accordance with the present invention;

FIG. 13 is a sectional view of the device of FIG. 12;

FIG. 14 is an enlarged sectional view of the passageway of the device of FIG. 13 taken substantially on line 14—14 thereof;

FIG. 15 is a pictorial view of a further line retension device, which is constructed in accordance with the present invention;

FIG. 16 is an enlarged sectional view of the device of FIG. 15; and

FIG. 17 is an enlarged sectional view of the passageway of the device of FIG. 16 taken substantially on line 17—17 thereof.

BEST MODE FOR CARRYING OUT THE INVENTION

Referring now to FIGS. 1-8, there is shown a line retension device 10, which is constructed in accordance with the present invention, and which cooperates with a similar device 11 to retain the tension on a drawstring line 12 threaded through a channel 14 extending about a hood 16 of a garment 18. The garment 18 is in the form of a jacket, but it is to be understood that various different types of garments and other fabric items, such as dufflebags, backpacks and other camping equipment or the like, may also employ the novel device of the present invention.

The devices 10 and 11 are attached to the opposite sides of the outside of the hood 16 at the ends of the channel 14.

A pair of line retension devices 21 and 23 are also constructed in accordance with the present invention, and are slidably secured to the opposite dangling ends of the drawstring line 25, which is threaded through a channel 27 extending along the waist-encircling bottom edge of the garment 18.

While the devices are shown pictorially in FIG. 1 generally to a proper proportion relative to the size of the garment 18, the devices are shown somewhat to a larger relative proportion for illustration purposes.

In use, when the garment 18 is worn by the wearer, and it is desired to secure the hood 16 about the face of the wearer, the drawstring line 12 can be readily tensioned by slipping the fingers inside the hood behind the device 10, and pressing with the thumb of the same hand against the device 10 to deform it between the fingers and the thumb to release the frictional engagement with the line 12 to a sufficient extent to allow relative movement between the device 10 and the line 12. In this manner, once the device 10 is deformed, the end 12A can be pulled with the other hand to draw the hood 16 about the face of the wearer. In this regard, the other end 12B is secured in place by the device 11. Once the proper tension is realized, the wearer releases the pressure applied to the device 10 to allow it to regain frictional engagement with the drawstring line 12 for tensioning purposes.

In order to release the tension on the line 12, the device 10 is again pressed between the fingers and the thumb to deform it. Thereafter, the outer hand of the wearer merely pulls on the hood 14 at the channel 14 to move the line 12 relative to the device 10 for loosening the hood about the face of the wearer.

It can be seen that the similar or like device 11 can also be actuated in a similar manner by the user.

Alternately, if desired, the user can tighten the line 12 with one hand only. In this regard, since the devices 10 and 11 are fixed to the hood, the user need only grasp either end of the line 12 and pull it downwardly, since the devices 10 and 11 frictionally grip the line and such pulling operation overcomes the frictional force. To loosen the hood, the channel can be grasped at either side and pulled apart.

Thus, the line 12 can be tensioned or released in a very convenient manner, either with one hand or two, without the necessity of tying a knot in the line 12, and then subsequently untying it. Moreover, by employing a pair of the device, such as the device 10, on opposite ends of the line 12, the ends of the line cannot be readily slipped back into the seam 14 inadvertently. Also, since the devices 10 and 11 are attached fixedly to the hood, the devices can not be easily misplaced or lost.

As shown in FIGS. 2-5, the devices 21 and 23 function in a similar manner as to the device 10. In this regard, when a person wears the garment 18 and secures it about himself or herself, the line 25 can be tightened about the waist of the wearer by merely squeezing the device 21 between the fingers and thumb of the user to deform it, and then pulling the end 25A of the line 25 relative to the device 21. By so doing, the device 23 at the opposite end of the line 25, is pulled upwardly and into engagement with the end of the channel 27. At the same time, the device 21 is slid along the line 25 until the device 21 also engages the other end of the channel 27. In this manner, the bottom edge of the garment 18 is held in snug engagement about the waist of the wearer.

Additionally, the tension on the line 25 can be easily released by reversing the process and sliding the device 21 away from the channel 27 to loosen it about the wearer's waist. Thus, the line 25 can be secured about the waist of the wearer in a convenient manner and then the tension can be released in an equally easy and facile manner. Also, the dangling ends of the line 25 remain in position at the outside of the channel 27 as a result of the retension devices 21 and 23, which are too large to enter the channel 27.

Considering now the device 10 in greater detail, it being understood that the other like device 11 is similar to it, and need not be described in any greater detail.

Referring now to FIGS. 6, 7 and 8, the line retension device 10, slidably receives the line 12, which is in the form of a generally flat fabric ribbon or webbing.

The device 10 includes a base plate 121, which is composed of a suitable thermoplastic material, which is flexible and pliable. The plate 121 includes a generally rectangular portion 123, having a large central opening 124 extending therethrough. The portion 123 is sewn to the hood 16 by means of the stitching 122 extending through the thin plate portion 123. The plate 121 is sufficiently thin to allow the passage of a needle (not shown) therethrough for securing the device 10 to the garment 16. In this regard, the generally flat surface area of the plate 121 enables the device 10 to be fixedly secured to the garment 16.

An upstanding dome or cup-shaped portion 125 is integrally connected to the base portion 121 and extends over the opening 124. The portion 125 includes a pair of angularly inclined upstanding end portions 127 and 129, which are integrally connected to a bight or upper ridge portion 132 extending across the opening 124. A pair of integral side walls, such as the wall 133, are disposed on either side thereof.

The passageway 119 receiving the line 12, is toruous or non-linear in configuration and is configured and dimensioned to be complementary shaped and sized relative to the cross-sectional shape and size of the line 12. In this regard, the cross-sectional shape of the line is a thin, flat ribbon or webbing, as best seen in FIG. 8.

As shown in FIG. 7, an entrance opening 138 of the passageway 119 on the underside of the device receives the line 12, which exits the device 10 at an exit hole 141 of the passageway 119.

When the upper portion 132 is pressed downwardly toward the opening 124, the U-shaped portion 125 deforms until the passageway 119 is closer to a linear configuration for decreasing greatly the frictional gripping of the line 12. When the portion 132 is released, the device 116 snaps back into its unstressed position as shown in the drawings. The device 10 is constructed of thin, pliable material, and thus the device 10 is readily deformable and yet is sufficiently resilient to snap back to the normal unstressed shaped.

Referring now to FIG. 17, there is seen that the passageway 119 is complementary sized and shaped relative to the cross-sectional configuration of the line 12, for frictionally gripping it. In order to facilitate the releasing of the frictional gripping, a pair of diametrically opposed slots or openings 134 and 136 open into the passageway 119.

Referring now to FIGS. 2–5, the device 21 will now be described in greater detail, it being understood that the device 23 is similar to it and thus need not be described in any greater detail. The device 21 includes a plate 29, which is bowed in its unstressed condition and is generally C-shaped, as best seen in FIG. 3. The plate 29 is composed of a suitable thermoplastic material similar to the material of the device 10, and is thin and light in weight.

A passageway 32 extends longitudinally through the plate 29 for receiving the line 25 in a frictional manner. The cross-sectional area of the passageway 32 is complementary shaped and sized relative to the size and shape of the line 12, which is in the form of a cord. The line 12 is circular in cross-section throughout its length. In the unstressed configuration of the plate 29 as shown in FIG. 3, the configuration of the passageway 32 is of a similar shape as the unstressed shape of the plate 29. In this regard, the passageway 32 is tortuous or non-linear in configuration to further grip frictionally and confine the line 25 in position.

In order to release frictional gripping of the line 25 to a sufficient extent to allow the line and the device 21 to be adjusted positionally relative to one another, pressure is applied in the direction of the arrow to the plate 29 for causing it to deform into a substantially flattened position as shown in FIG. 4. In this stressed position, the passageway 32 is generally, or at least closer to a linear configuration, and thus the line 25 can more readily be slipped through the passageway 32 toward and away from the channel 27.

Considering now the plate 29 in greater detail, the plate 29 includes a central portion 34 which interconnects with a pair of end portions 38 and 41 by means of a pair of web portions 43 and 45 respectively. The web portions 43 and 45 serve as hinges so that when the pressure is applied to the central portion 36, it is generally flattened between the fingers and thumb of the user. In so flattening the device 21, the outer end portions 38 and 41 flex into positions on either side of the central portions 36 so that the outer face of the plate 29 is generally co-planar with the end portions 38 and 41, as shown in FIG. 4. In order to assume such a stressed position, the plate 29 flexes about the webs 43 and 45.

Referring how to FIG. 5, the cross-sectional configuration of the passageway 32 is generally circular in configuration, except that it has an undulating or irregular perimeter for providing a secure frictional gripping of the line 25. In this regard, the undulating configuration includes a series of equally spaced-apart rounded projections 47 for engaging the line 25 with a high pressure per unit area.

Referring now to FIGS. 9–11, there is shown a line retension device 48, which is constructed in accordance with the present invention, and which is adapted to serve a similar function as the waist encircling line retaining devices 21 and 23 of FIG. 1. The device 48 includes a flat plate 49, which is composed of similar material as the plate 29. A passageway 52 extends longitudinally through the plate 49 and frictionally receives a line 50.

The plate 49 includes a raised decorative rim extending about its periphery and has an integral longitudinally-extending tubular portion 56, defines the passageway 52.

As shown in FIG. 11, the passageway 52 has a cross-sectional area throughout its length of a slit-like oval configuration. In this regard, the line 50 is in the form of a fabric ribbon or webbing, which is generally flat and has a complementary cross-sectional shape to provide for frictional gripping of the line 50. Thus, the device 48 can readily be slid along the line 50 to adjust it positionally in a similar manner to that of the devices 21 and 23.

Referring now to FIGS. 15, 16 and 17, there is shown another line retension device 61, which is constructed in accordance with the present invention and which also serves a similar function as the devices 21 and 23. The device 61 is adapted to retain a line 63, in a similar manner as the device 21.

The device 61 generally includes a plate 65, which is constructed of similar material as the device 10. The plate 65 has a rectangular end portion 67, which is integrally connected to a short rectangular angularly disposed intermediate portion 69, which in turn is connected integrally to an angularly downwardly depending wedge-shaped end portion 72.

The line 63 extends through a passageway generally indicated at 73 (FIG. 16). The passageway 73 is generally tortuous or non-linear in configuration to facilitate the frictional gripping of the line 63. In this regard, the passageway 73 includes a portion 74 extending through the tubular portion 76, and to a hole 78 (FIG. 15) in the intermediate portion 69, and continues along a passageway portion 81 in the depending end portion 72 of the plate 65.

The overall configuration of the plate 65 is somewhat V-shaped in its unstressed condition as best seen in FIG. 16. In order to release the line 63, pressure is manually applied to the outer surface of the portion 72 to flatten substantially the plate 65 between the fingers and thumb of the user. In this manner, the portion 72 is generally coplanar with the portion 67, in the stressed condition as indicated by the broken line showing of the portion 72 in FIG. 16. In such a stressed position, the line 63 is more readily moveable within the passageway 73 so that the device 61 can be slid along the line 63 when it is pulled through the device 61.

Referring now to FIGS. 12, 13 and 14, there is shown a further line retension device 85, which operates in a similar manner as the device 10, and which is constructed in accordance with the present invention. The device 85 receives a line 87 for retaining it in place. The device 85 includes a plate 89, which is constructed of a similar material as the device 10. The plate 89 includes a passageway 92, which is generally tortuous or non-linear when the plate 89 is disposed in its unstressed condition.

The plate 89 includes a generally rectangular plate 94, having a large central opening 95 therein and having thin stitch receiving areas generally indicated at 97 to enable the device 85 to be affixed to a garment or other fabric item (not shown). A generally U-shaped integrally-connected portion 96 extends longitudinally across the opening 95. The U-shaped portion 96 includes a pair of inclined upstanding end portions 98 and 101 which are interconnected by a longitudinally extending bight portion 103, which has a serrated outer surface 104 to facilitate the pressing thereon by the user. A pair of transversely extending undercuts 104 and 105 in the respective end portions 98 and 101 facilitate the deformation of the U-shaped portion 96 into the opening 95 for releasing frictionaly engagement with the line 87 to a sufficient extent to permit the device 85 to be readily slid along the line 87.

In order to facilitate the deformation of the device into a position to enable the passageway 92 to assume a configuration which more closely approximates a linear configuration, the plate 89 is composed of a thin, pliable and flexible material, which can be readily deformed, and which is similar to the material of the device 10. Such a material must be suitably resilient to snap back into its normal unstressed position, as shown in solid lines in FIG. 13. The broken lines showing in FIG. 13 illustrates the stressed position of the device 85.

Referring now to FIG. 14, the cross-sectional configuration of the passageway 92 closely conforms to the size and shape of the cross-sectional area of the line 87 for tightly and frictionally engaging the line 87. In order to facilitate the releasing of the frictional engagement of the line 87, a series of four radially extending openings 107, 109, 112 and 114 communicate with the circular passageway 92.

While particular embodiments of the present invention have been disclosed, it is to be understood that various different modifications are possible, and are contemplated within the true spirit and scope of the appended claims. For example, many different types and kinds of materials may be employed in connected with the device of the present invention. There is no intention, therefore, of limitations to the exact abstract or disclosure herein presented.

I claim:

1. A retension device for a line extending through a channel opening in a fabric material, comprising:

a relatively thin, generally flat plate having a planar surface adapted to be sewn to the surface of the fabric material, and a cross-sectional area that is larger than the channel opening in the fabric material to inhibit passage of the plate into the channel opening;

a raised cup-shaped portion defining an elongated passageway for receiving the line to be retained and for deforming readily responsive to pressure applied digitally;

an upper ridge portion at least partially defining said passageway extending generally in a parallel spaced-apart manner relative to said plate for supporting frictionally said line over a substantial length thereof away from said plate to retain the line in an unstressed condition of the device;

said passageway extending generally longitudinally throughout substantially the entire length of said raised portion, and having a tortuous configuration in the unstressed condition of said raised portion;

said raised portion being integrally connected to said plate and composed of a single piece of plastic material;

said raised portion being adapted to be flexed manually by a single digit of the hand of the user toward the plate, to deform into a position into closer proximity to said plate for decreasing the tension on the line and for straightening the configuration of said passageway, to a sufficient extent for permitting the line to be moved freely positionally relative to said plate;

the cross-sectional area of said passageway being complementary shaped and sized relative to the cross-sectional shape and size of the line, to enable the raised portion to receive the line in a friction tight manner;

said raised portion being of sufficient length to engage frictionally the line, and to inhibit relative movement of the line and said passageway;

wherein said raised portion includes a pair of upstanding end walls and a pair of upstanding side walls;

wherein said device is an integral one-piece construction; and said upstanding end walls and said upstanding side walls are interconnected by said ridge portion, said ridge portion being a longitudinally extending bight portion.

2. A retension device according to claim 1, wherein said bight portion has a serrated outer surface, to facilitate pressing thereon by the user.

3. A retension device according to claim 1, wherein each one of said upstanding end walls includes a transversely extending undercut to facilitate the deformation of said raised portion.

* * * * *